United States Patent Office 3,342,797
Patented Sept. 19, 1967

3,342,797
WATER-SOLUBLE REACTIVE DYES CONTAINING HALOPYRIMIDINE-5-CARBOXAMIDO GROUPS
Jacques Guenthard, Binningen, Basel-Land, Switzerland, assignor to Sandoz Ltd., (also known as Sandoz A.G.), Basel, Switzerland
No Drawing. Filed Sept. 28, 1964, Ser. No. 399,899
Claims priority, application Switzerland, Oct. 4, 1963, 12,266/63
8 Claims. (Cl. 260—146)

This invention relates to water-soluble reactive dyes of the formula

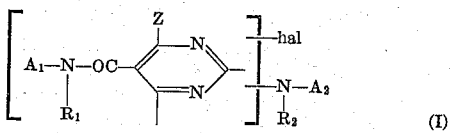

(I)

wherein each of $A_1$ and $A_2$ represents a hydrogen atom, the radical of a water-soluble dye or an alkyl radical, preferably a lower alkyl radical, which may be substituted by hydroxy, lower alkoxy, carboxylic acid or sulfonic acid groups or an aromatic carbocyclic at most binuclear radical which may be substituted by hydroxy, lower alkyl, lower alkoxy, carboxylic acid or sulfonic acid groups, $A_1$ and $A_2$ being identical or different from each other, but at least one of them being the radical of a water-soluble dye, $R_1$ represents hydrogen or an unsubstituted or substituted lower alkyl radical, $R_2$ represents hydrogen or an unsubstituted or substituted lower alkyl radical, hal represents chlorine or bromine, and Z represents hydrogen, chlorine, bromine or methyl which may be substituted either by chlorine or bromine.

The process for the production of the new water-soluble reactive dyes consists in reacting 1 mole of a compound of the formula

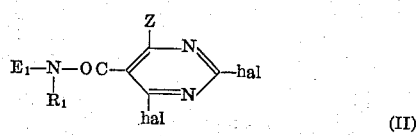

(II)

wherein $E_1$ represents a hydrogen atom or the radical of a water-soluble dye, or of an organic compound which may be capable of dye formation and hal and Z have one of the aforestated meanings, with 1 mole of a compound of the formula

(III)

wherein $E_2$ represents a hydrogen atom or the radical of a water-soluble dye, or of an organic compound which may be capable of dye formation and $R_2$ has one of the aforestated meanings. In these formula $E_1$ and $E_2$ may be identical, but at least one of the two must stand for the radical of a water-soluble dye or of a compound capable of dye formation. When $E_1$ and $E_2$ or both $E_1$ and $E_2$, represent a radical or radicals of a compound capable of dye formation, the reaction product is converted into a water-soluble dye by azo coupling or condensation.

The reaction of the compounds of Formula II with those of Formula III is effected preferably in an aqueous or aqueous-organic medium at a weakly acid, neutral or weakly alkaline reaction, i.g. in the pH range of 4 to 10, and at a low or moderately high temperature, e.g. 0–50° C., or preferably 15–30° C. In general, approximately one mole of a compound of Formula II is employed to each mole of an amino for acylation of the dyes or the intermediates. The halogen halide formed is neutralized with an acid-binding agent, added either at the commencement of the reaction or in small portions during its course. Suitable agents for this purpose are sodium acetate, sodium carbonate and bicarbonate, sodium tetraborate, trisodium phosphate and sodium hydroxide in powder form or in concentrated aqueous solution. Potassium or lithium salts can be used as alternatives to sodium salts. The addition of small amounts of a wetting or emulsifying agent can accelerate the rate of reaction. When a purely organic medium is employed it is of advantage to add to the reaction mixture a tertiary amine to act as acid-binding agent, e.g. dimethyl- or diethyl-aminobenzene, pyridine or a mixture of pyridine bases.

The starting dyes of Formula II may belong to different classes. They may be, for instance, monoazo dyes, e.g. of the type benzene-azo-pyrazolone, polyazo dyes, e.g. of the type benzene-azo-benzene-azo-naphthalene, anthraquinone dyes, e.g. of the type 1 - amino - 2 sulfo - 4- (mononuclear) arylamino-anthraquinone, phthalocyanine dyes, e.g. of the type copper-phthalocyanine-trisulfonic acid, nitro dyes, e.g. of the type 2-nitro-1,1'-diphenylamine-4-sulfonic acid-phenylamide, or formazane dyes, e.g. the copper complex compound of the dye N,N'-bis-[2-hydroxy - 4-(2'-carboxy-phenylaminosulfonyl)phenyl] ms - (4" - amino - 2",5" - dimethoxyphenylsulfonyl)-formazane.

The azo dyes may be metal-free, metal-containing, non-metallizable, or metallizable, e.g. suitable for complexing with chrominum or copper compounds. Particularly suitable metal-containing dyes are the 1:1 copper, 1:1 nickel, 1:2 chromium and 1:2 cobalt complex dyes. Phthalocyanine dyes, when used, may contain the usual metals as central atoms, e.g. copper, cobalt or nickel.

The preferred starting dyes of Formula II are those having at least one but generally not more than three or four salt-forming, water-solubilizing groups. The principal groups of this type are the sulfonic acid, carboxylic acid, sulfuric acid ester and sulfonic acid amide groups, of which the last-named may be acylated. They are normally linked to the base molecule of the dye or to a hydrocarbon radical bound to that molecule.

Similarly, the dyes of Formula III can be chosen from different classes, e.g. the mono-, or poly-azo, anthraquinone, nitro, formazane or phthalocyanine series. The azo dyes also may be metal-free, metal-containing, non-metallizable or metallizable. The phthalocyanines may contain as central atoms the usual metal atoms, e.g. copper, cobalt or nickel. The preferred dyes of Formula III are those having at least one but generally not more than three or four salt-forming, water-solubilizing groups. The principal groups of this type are the sulfonic acid, carboxylic acid sulfuric acid ester and sulfonic acid amide groups, of which the last-named may be acylated. They are normally linked to the base molecule of the dye or to a hydrocarbon radical bound to that molecule. When the substituents $R_1$ and $R_2$ are unsubstituted or substituted alkyl radicals they contain preferably 1 to 5 carbon atoms and are, e.g., methyl, ethyl, n-propyl, isopropyl, n-butyl, 2-hydroxyethyl, 2- or 3-hydroxypropyl, 2-ethoxy- or 2-methoxy-ethyl, 2- or 3-methoxypropyl or 2-chlorethyl. They can also be a benzyl or phenylethyl radical.

The groups

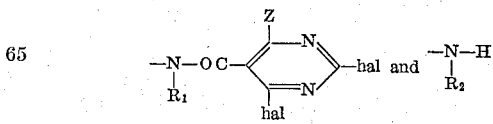

may occupy any of the positions of the dye molecule. In azo dyes, for instance, they can be present in the diazo component or the coupling component, or in the case of disazo dyes in the central component; in anthraquinone and phthalocyanine dyes they can be bound directly to the dye molecule, i.e. on the anthraquinone nucleus or the benzene nuclei of the phthalocyanine molecule. But is is preferable for these groups to be present on a substituent of the base molecule, for instance in phthalocyanines on an aliphatic or aromatic radical bound through a sulfonic acid amide group to a benzene nucleus of the phthalocyanine molecule, e.g.

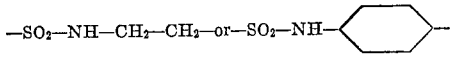

and in anthraquinones on a phenyl, phenylaminophenyl, diphenyl, phenoxyphenyl or phenylthiophenyl radical.

1,4-diaminoanthraquinones having at least one amino group substituted by one of the aforenamed radicals are particularly suitable. The anthraquinones may contain further substituents in the nucleus, e.g. halogen atoms or hydroxyl, lower alkylsulfonyl, e.g. methylsulfonyl, arylsulfonyl, e.g. phenylsulfonyl, hydroxyphenyl, alkoxyphenyl, e.g. methoxyphenyl, or phenoxy groups; dyes of other chemical classes can be similarly substituted. Thus the azo, anthraquinone and phthalocyanine dyes and dye intermediates containing amino groups which are disclosed in French patent specification 1,247,660 and the dyes disclosed in Swiss patent specification 359,228, pages 1 to 6, are suitable for the production of reactive dyes according to the present invention.

Examples of suitable compounds of Formula (II) are the dyes described in the examples of U.S. patent application Ser. No. 364,306; filed May 1, 1964, and Belgian patent No. 645,855.

The following are enumerated to exemplify suitable compounds of formulae

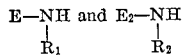

Aminocarboxylic acids such as aminoacetic acid, N-methylaminoacetic acid, α- or β-aminopropionic acid, α-amino butyric acid, α-amino-iso-valeric acid, 2-, 3- and 4-aminobenzoic acid, 2-aminoglutaric acid, 2-aminosuccinic acid, 4-aminophthalic acid, 4- and 5-amino-iso-phthalic acid and 2-aminoterephthalic acid; aminosulfonic acids, such as 2-amino- and 2-methylamino-ethanesulfonic acid, 3-amino-2-hydroxypropanesulfonic acid, 2-, 3- and 4-aminobenzenesulfonic acid, 4-aminobenzene-1,3-disulfonic acid, 2-aminobenzene-1,4-disulfonic acid, 1-aminonaphthalene-4-, -5-, -6-, -7- and -8-sulfonic acid, 2-aminonaphthalene-5- or -6-sulfonic acid, 1-aminonaphthalene-3,6-, -3,8- or -4,8-disulfonic acid, 2-aminonaphthalene-4,8-, 5,7- or -6,8- disulfonic acid, 1-aminonaphthalene-3,6,8-trisulfonic acid, 2 - aminonaphthalene-3,6,8- and 4,6,8- trisulfonic acid; low-molecular amino-hydroxy compounds, such as 2-hydroxyethylamine, 2- or 3-hydroxypropylamine, di-(2-hydroxyethyl)-amine, di-(2- or 3-hyroxypropyl)-amine, methylamine, dimethylamine, ammonia, aminobenzene and N-methylaminobenzene. When $E_1$ and/or $E_2$ represents a radical capable of dye formation, the reaction product is condensed with a suitable dye containing at least one sulfonic acid halide or carboxylic acid halide group, e.g. a copper phthalocyanine-tri- or-tetra-sulfonic acid chloride, or it is coupled with a diazonium salt to form a water-soluble dye. The condensing or the coupling reaction is performed in a weakly acid, neutral or alkaline medium in the temperature range of from 0° C. to about 30° C., and with the addition of an alkali, e.g. sodium acetate, carbonate or bicarbonate, in order to neutralize the mineral acid formed, e.g. hydrogen halide, sulfuric acid or sulfonic acid when the diazonium salt used contains a sulfonic acid group. Azo coupling is an important reaction for the formation of the final dyes. It can be carried out by reacting a compound of Formula (II) with a compound of Formula (III) containing at least one readily acylatable amino group plus one poorly acylatable but diazotizable amino group, diazotizing the intermediate and coupling the diazo compound with a coupling component to give a water-soluble dye. When diamines having two equally reactive amino groups are employed, e.g. 1,3- or 1,4-diaminobenzene, it is best to work with an excess of diamine to obtain the best possible yield of the monocondensation product and to prevent the second amino group from being condensed. Suitable coupling components are, e.g., phenolic hydroxy compounds, such as mono- and di-hydroxybenzenes, mono- and di-hydroxynaphthalenes which may be further substituted, e.g. with amino, acylamino, alkyl or alkoxy groups or halogen atoms, or in the case of naphthalene derivatives with sulfonic acid groups enolic hydroxy compounds, such as pyrazolones, acylacetylamino derivatives, preferably 1-aryl-3-methyl- or 1 - aryl-3-carboxy-5-pyrazolones, barbituric acid, acetoacetylamino- and benzoylacetylamino-benzenes and -naphthalenes which may be substituted with alkyl and alkoxy groups, halogen atoms, or preferably sulfonic acid groups; compounds capable of reacting twice with diazonium salts with formation of formazane dyes, e.g. cyclohexanone, levulinic acid, malonic acid derivatives, cyanacetic acid, acetylmethylsulfonyl-benzene or -naphthalene, carboxymethylsulfonylbenzene or -naphthalene and their sulfonic acids; amino compounds, such as aminobenzenes coupling in para position to the amino group, notably N,N-dialkylaminobenzenes which may be further substituted; aminonaphthalenes which couple in the ortho position to the amino group and may be monoalkylated or monoarylated and may contain further substituents, e.g. hydroxyl groups and/or sulfonic acid groups, and 5-aminopyrazoles.

Alternatively, a compound of Formula (II) can be condensed with certain compounds of Formula (III) to yield an intermediate which can be used as coupling component. The compounds of Formula (III) suitable hereto are those containing at least one acylatable amino group plus a carbon atom capable of coupling once or twice, e.g. aminohydroxy compounds such as aminohydroxybenzenes and -naphthalenes and their sulfonic acids, amino-enol compounds such as aminoarylpyrazolones, amino-acylacetylamino-benzenes and -naphthalenes and their sulfonic acids, and compounds capable of reacting twice with diazonium salts with the formation of formazane dyes, such as aminocyclohexanone, 1-amino-3- and 1-amino -4-carboxymethylsulfonyl-benzene or -napthalene and 1-amino -3- or -4-acetyl-methyl-sulfonyl-benzene or -naphthalene.

$E_1$ can denote the radical of a diazo component or of a coupling component, which is similarly converted by azo coupling into the radical of an azo dye. Examples of organic compounds suitable for the synthesis of the final reactive dyes are 1,3- and 1,4-diaminobenzenesulfonic acids, 1,3- and 1,4-diaminobenzenecarboxylic acids, 4,4'-diamino-1,1'-diphenyl-3-sulfonic acid, 1-(3'- and 4'-amino)-phenyl-3-methyl - 5 - pyrazolones, aminohydroxynaphthalenes or preferably their sulfonic acids, such as 2-amino-5-hydroxynaphthalene-7-sulfonic acid and -1,7-disulfonic acid, 2-amino-8-hydroxynaphthalene-6-sulfonic acid and -3,6-disulfonic acid, 1-amino-8-hydroxy-naphthalene-4,6-disulfonic acid, or 1-amino-8-hydroxynaphthalene-3,6-disulfonic acid.

The monoacylamino-monoamino compounds formed by monocondensation of diamines with a compound of Formula II can be converted into dyes by a second condensation with e.g., an aldehyde with formation of a Schiff's base or with an acid halide of a dye, preferably a carboxylic acid chloride or sulfonic acid chloride (copper phthalacyaninepolysulfonic acid chloride.). Also, the products obtained by reacting amino-ketomethylene compounds, such as amino-pyrazolones and amino-acylacetyl-amino compounds with compounds of Formula II can be condensed with an aldehyde, preferably a substituted or unsubstituted N,N-dialkylaminobenzaldehyde, to give styryl dyes.

A further mode of operation for the production of the new reactive dyes consist in the reaction of 1 mole of a compound of the formula

    (IV)

wherein $E_3$ represents the radical of a water-soluble dye or of an organic compound capable of dye formation and $R_3$ represents hydrogen or a substituted or unsubstituted alkyl radical, with 1 mole of a compound of the formula

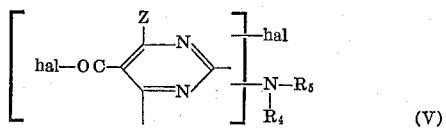    (V)

wherein $R_4$ represents hydrogen or a substituted or unsubstituted alkyl radical and $R_5$ represents hydrogen or a substituted or unsubstituted alkyl or aryl radical. When $E_3$ stands for the radical of a compound capable of dye formation, the reaction product is converted into a water-soluble dye by azo coupling or condensation. On completion of the reaction or of the condensation or coupling, the final reactive dye is precipitated from the solution or suspension—which may be previously neutralized if preferred—by the addition of sodium or potassium chloride or an acid. It is filtered off with suction, washed and dried.

Interesting dyes of the Formula I are those, in which $A_1$ represents the radical of a water-soluble monoazo dye, e.g. of the type: benzene-azo-naphthalene or benzene-azo-5-pyrazolone or their 1:1-copper, 1:1-nickel, 1:2-chromium or 1:2-cobalt complex compounds, polyazo dye, e.g. of the type: benzene-azo-benzene-azo-5-pyrazolone, benzene-azo-benzene-azo-naphthalene or benzene-azo-naphthalene-azo-benzene and their metal complex compounds, anthraquinone dye, e.g. of the type 1-amino-2-sulfo - 4 - phenylamino-anthraquinone, phthalocyanine dye, e.g. of the type: copper-phthalocyanine-di-or-trisulfonic acid, nitro dye, e.g. of the type 2-nitro-1,1-diphenylamine-4-sulfonic acid-phenylamide, or formazane dye, e.g. the 1:1 copper complex compound of N,N'-bis[2-hydroxy-4-(2'-carboxyphenylaminosulfonyl)-phenyl] - ms - (4''-amino-2'',5''-dimethoxyphenylsulfonyl)-formazane, and $A_2$ also represents the radical of a monoazo dye, polyazo dye, anthraquinone dye, phthalocyanine dye, nitro dye or formazane dye e.g. of the types mentioned above or of other types such as diphenyl-azo-naphthalene, benzene-azo-acetoacetylamino, naphthalene-azo-diphenyl-azo-benzene, naphthalene-azo-diphenyl-azo-naphthalene and their metal complex compounds, $A_1$ and $A_2$ being identical or different from each other. Further interesting dyes of Formula I are those, in which one of the symbols $A_1$ and $A_2$ represents the radical of a water-soluble monoazo dye, polyazo dye, anthraquinone dye, phthalocyanine dye, nitro dye or formazane dye, e.g. of the types mentioned hereinbefore, and the other represents hydrogen, alkyl, preferably lower alkyl, which may be substituted by hydroxy, alkoxy, halogen, e.g. chlorine, mononuclear aryl, e.g. phenyl, carboxylic acid or sulfonic acid groups, or carbocyclic aryl, preferably mononuclear or binuclear, which may be substituted by lower alkyl, lower alkoxy, halogen, e.g. chlorine, carboxylic acid or sulfonic acid groups.

Of course the various dye classes represented by $A_1$ and/or $A_2$ are not limited to the types mentioned as examples but also encompass other types, e.g. of the azo series: benzene-azo-benzene, benzene-azo-barbituric acid, naphthalene-azo-naphthalene, naphthalene-azo-5-pyrazolone, naphthalene-azo-acetoacetylamino, diphenyl-azo-5-pyrazolone, pyrene-azo-benzene, benzene-azo-benzene-azo-benzene, naphthalene-azo-naphthalene-azo-naphthalene, and their metal complex compounds (1:1-copper, 1:1-nickel, 1:2-chromium or 1:2-cobalt complex compounds), of the phthalocyanine series: nickel-phthalocyanine-trisulfonic acid, or of the formazane series: the 1:1-copper complex compound of N-(2-hydroxy-3,5-disulfophenyl)-N'-(4'-amino-2'-sulfophenyl) - ms - (4''-methylphenyl-sulfonyl)-formazane or of N-(2-carboxy-4-sulfophenyl)-N'(4'-amino-2'-sulfophenyl)-ms-butyryl-formazane or of N, N'-bis-(2-hydroxy - 5 - aminosulfonylphenyl) - ms - (3''-amino-4''methoxyphenylsulfonyl)formazane.

Especially valuable dyes of the Formula I are those, in which $A_1$ represents the radical of a blue water-soluble anthraquinone dye, e.g. of a 1-amino-2-sulfo-4-arylamino-anthraquinone dye which may bear additional —$SO_3H$ groups and/or halogen atoms, e.g. chlorine, lower alkyl or lower alkoxy groups on the anthraquinone and/or on the aryl nucleus, and $A_2$ represents also the radical of a blue water-soluble anthraquinone dye, or the radical of a water-soluble monoazo, disazo or nitro dye, so that the final dye possesses a shade which may vary from violet to blue and to green according to the shade of the monoazo, disazo or nitro dye employed, or $A_1$ represents the radical of a water-soluble phthalocyanine dye or formazane dye of the types described above and $A_2$ represents the radical of a water-soluble monoazo, disazo or nitro dye or $A_1$ represents the radical of a water-soluble monozao, disazo or nitro dye, e.g. of a benzene-azo-naphthalene or benzene-azo-5-pyrazolone dye, of a benzene-azo-benzene-azo-naphthalene or benzene-azo-naphthalene-azo-benzene or benzene-azo-benzene-azo-5-pyrazolone dye or a 2-nitro-diphenylamine dye, these dyes bearing 1 to 4 water-solubilizing groups, and $A_2$ represents the radical of a water-soluble anthraquinone, phthalocyanine or formazane dye of one of the types mentioned above.

The new reactive dyes which contain three or more water-solubilizing groups, such as carboxylic acid groups, sulfonic acid amide groups or, preferably, sulfonic acid groups, possess good solubility in water, good compatibility with salts and hard water, and good reactivity with cellulosic fibers, animal and synthetic polyamide fibers. They reserve acetate, triacetate, polyester, acrylic, polyvinyl chloride, polyvinyl acetate and polyalkylene fibers. Owing to their good aqueous solubility, the unfixed residue of dye on printed or dyed cellulosic fiber materials can be easily removed by washing.

Those reactive dyes of the invention which contain only one or two water-solubilizing groups, preferably sulfonic acid groups, are highly suitable for the exhaustion dyeing of cellulosic fibers and for the acid dyeing of wool, silk and synthetic polyamide fibers.

Beside the number of water-solubilizing groups the substantivity is a significant factor for the properties of the new dyes. When one of the constituents of the dye is a group like:

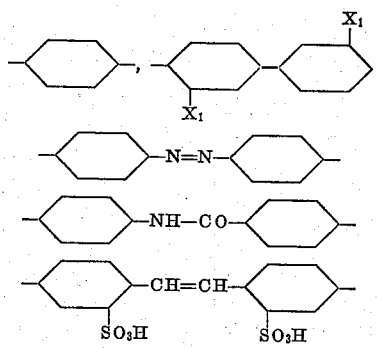

or

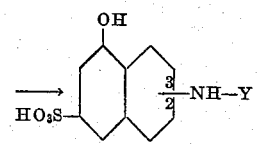

it is more substantive than a corresponding dye having a group like the following:

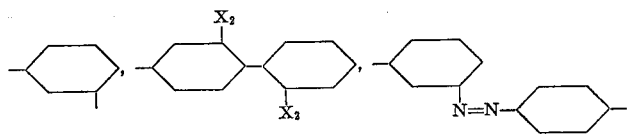

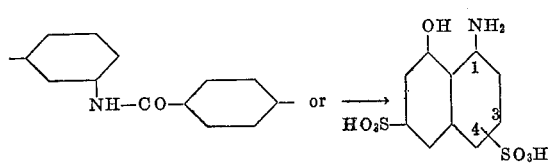

In the formulae $X_1$ represents in both positions a hydrogen atom or a halogen atom, or a methyl, methoxy, ethoxy or —$SO_3H$— group, or alternatively one $X_1$ represents a hydrogen atom and the other —$SO_3H$; $X_2$ in both positions represents a halogen atom, or a methyl, methoxy, ethoxy or —$SO_3H$ group; Y represents a hydrogen atom, a low-molecular alkyl group or a phenyl group which may be substituted by alkyl or alkoxy groups; and the arrow denotes the coupling position in the aminohydroxynaphthalenesulfonic acids.

The introduction of an additional water-solubilizing group, e.g. an —$SO_3H$— group, normally results in higher solubility in water and a reduction in the affinity for cellulosic fibers. But when the dye contains a substantive group as well as an additional —$SO_3H$ group, it has the increased solubility in water but does not lose its good affinity for cellulosic fibers. Hence dyes with, for instance, three —$SO_3H$— groups can be employed for exhaustion dyeing provided they also contain one or more substantive groups.

In comparison with the dyes of Formula (II) used as starting products, the final dyes show considerably higher storage stability both in powder form and in solution in padding liquors and printing pastes. Moreover all desired shades, in particular the intermediate tones, such as green, violet, orange and scarlet, can be produced in a simple way by combining two different chromophores.

The new reactive dyes are suitable for dyeing leather and for dyeing, padding and printing fibers of animal and vegetable origin, fibers of regenerated cellulose, casein fibers, animalized cellulose fibers, and synthetic polyamide fibers, and also blended materials consisting of the aforestated fibers.

The optimum conditions of application vary with the type of fiber and the particular dyes used. Animal fibers and synthetic polyamide fibers are dyed, printed or fixed preferably in an acid, neutral or weakly alkaline medium, e.g. in the presence of acetic, formic or sulfuric acid, ammonium sulfate, sodium metaphosphate etc. The dyes can be applied from an acetic acid to neutral medium in the presence of a leveling agent, e.g. polyoxethylated fatty amines or mixtures of these and alkylpolyglycol ethers, and the bath adjusted to a neutral or weakly alkaline reaction at the end of the operation by the addition of small amounts of an agent of alkaline reaction, e.g. ammonia, sodium carbonate or bicarbonate, or of compounds which react alkaline on heating, e.g. hexamethylene-tetramine or urea. Subsequently the goods are rinsed well and acidified with acetic acid.

In the dyeing and printing of textile materials made of animal or synthetic polyamide fibers the chemical linkage between the dye molecule and the fiber is often less pronounced than otherwise, depending on the reactivity of the dye; this is due to the fact that the dye owes its affinity for the fiber partly to its acidic character. The dyeings on wool and synthetic polyamide fibers have good light fastness and excellent fastness to perspiration, washing, water, sea water, milling and dry cleaning.

The dyeing, padding and printing or fixation of the dyes on cellulosic fibers is carried out in alkaline medium, e.g. in the presence of sodium carbonate or bicarbonate, sodium or potassium hydroxide, sodium metasilicate, sodium borate, trisodium phosphate, ammonia, etc. To prevent reduction effects, it is often of advantage to add a mild oxidizing agent, such as sodium-3-nitrobenzene-1-sulfonate to the dyebath, padding liquor or printing paste. In contrast to the starting compounds of Formula (II), which are cold-dyeing types, the final dyes are so-called hot-dyeing brands and are normally fixed on cellulosic materials with heating. Provided a sufficiently strong alkali is used, such as sodium or potassium hydroxide or sodium silicate, and a storage time of 24 hours or more is allowed, fixation can be effected at temperatures of 20° to 40° C.

The dyeings and prints on cellulosic fibers are outstandingly fast to wet treatments (washing, water, sea water, perspiration) as well as to rubbing, alkali, acetic acid cross-dyeing, and dry cleaning, and highly resistant to alkaline hydrolytic influences. These properties are due to the formation of a stable chemical linkage between the dye molecule and the cellulose molecule. Often the entire amount of dye applied to the fiber does not participate in the reaction; the unreacted residue is removed from the goods by suitable treatment, such as rinsing and/or soaping, if necessary at high temperature, for which purpose synthetic detergents can be used, e.g. alkylarylsulfonates such as sodium dodecylbenzenesulfonate, alkylsulfates such as sodium lauryl sulfate, optionally sulfated or carboxymethylated alkyl-polyglycol, monoalkyl- and dialkyl-phenylpolyglycol ethers such as sodium lauryl polyglycol ether sulfate, and sodium lauryl polygyco ether acetate.

In the following examples the parts and percentages are by weight and the temperatures in degrees centigrade.

*Example 1*

28 parts of 4-amino-1,1'-azobenzene-4'-sulfonic acid are dissolved in 500 parts of water at 20–30° with the addition of sufficient dilute sodium hydroxide solution to obtain the pH value 8.5. 71 parts of the sodium salt of condensation product of 1-amino-4-(3'-amino)-phenyl-aminoanthraquinone-2,4'-disulfonic acid and 2,4-dichloropyrimidine-5-carbonyl chloride are strewn into the solution in the course of 1 hour with the addition of further dilute sodium hydroxide solution to maintain the pH at 7.5–8.5. When chromatography of a sample of the reaction mixture shows that no further starting substance is present, 70 parts of sodium chloride are added to precipitate the dye. It is filtered off and vacuum dried at 60°. A dark green powder is obtained which dyes cotton from aqueous solution in green shades having very good light and excellent wet fastness. The dye has the formula:

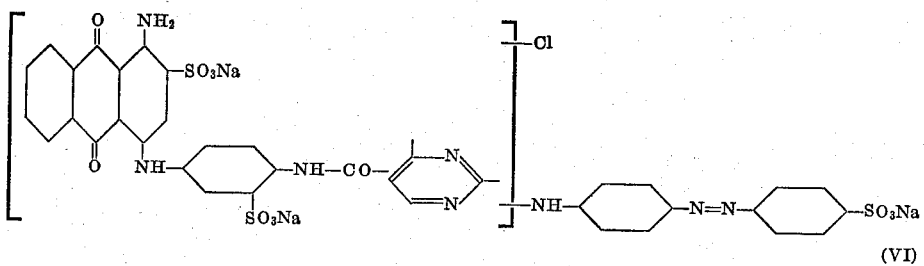

*Dyeing method.*—1.5 parts of the dye of Example 1 are dissolved in 4000 parts of softened water at 40°. 100 parts of mercerised cotton fabric are entered into this bath. Then 110 parts of calcined sodium sulfate and 30 parts of calcined sodium carbonate are added. The bath is raised to 100° in 30 minutes, with the addition after the first 10 minutes of 110 parts and after 20 minutes of 100 parts of calcined sodium sulfate. When 100° is reached, 50 parts of calcined sodium carbonate are added and this temperature is maintained for 1 hour. The goods are rinsed with cold and warm water, soaped at the boil for 10–20 minutes with a 2 g./l. solution of an alkylpolyglycol ether sulfate, rinsed well and dried. A green dyeing fast to light and wet treatments is obtained.

Example 2

17.5 parts of 1-aminobenzene-3-sulfonic acid and 71 parts of the sodium salt of the condensation product of 1 - amino - 4 - (3' - amino) - phenylaminoanthraquinone-2,4-disulfonic acid and 2,4-dichloropyrimidine-5-carbonyl chloride are stirred into 500 parts of water at 20–25°. The pH of the mixture is adjusted to 7.5 with dilute sodium carbonate solution and it is maintained at this value for 2 hours with the addition of further sodium carbonate solution if necessary. When chromatography of a sample of the reaction mixture indicates that no further starting material is present, 50 parts of sodium chloride are added to precipitate the dye. It is filtered off, washed with dilute sodium chloride solution, vacuum dried at 50–60° and ground. A dark blue dye in powder form is obtained which has the formula

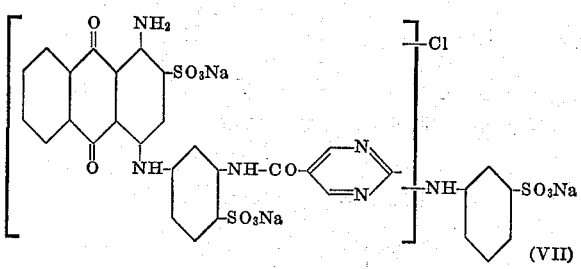

This dye dissolves in water to give brilliant blue solutions and dyes cotton from aqueous solution in brilliant blue shades.

*Printing method.*—Mercerised cotton fabric is printed with a paste of the following composition:

| | Parts |
|---|---|
| Dye of Example 2 | 30 |
| Urea | 100 |
| Water | 395 |
| 3% sodium alginate thickening | 450 |
| Sodium-1-nitrobenzene-3-sulfonate | 10 |
| Sodium carbonate | 15 |
| Total | 1000 |

The fabric is dried, steamed for 10–15 minutes at 102–104°, rinsed with cold and warm water, soaped at the boil, rinsed again and dried. A blue print is obtained having very good wet fastness properties and excllent light fastness.

Example 3

71 parts of the yellow dye of the formula

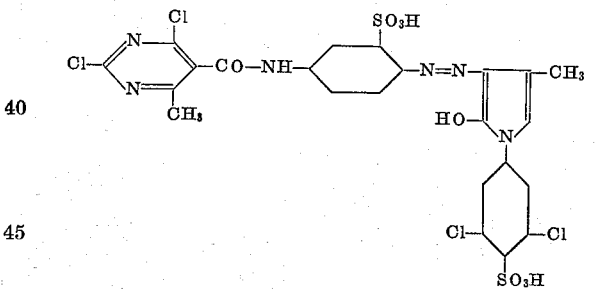

are dissolved in 600 parts of water at 20–25° with the amount of dilute sodium carbonate solution necessary for dissolving, and the pH of the solution adjusted to about 7.5. In the course of 2 hours 53 parts of sodium-1 - amino - 4 - (4' - amino) - phenylaminoanthraquinone-2,6-disulfonate are strewn in, the pH of the mixture being maintained between 6.5 and 8 with further dilute sodium carbonate solution. On completion of condensation 1000 parts of 25% sodium chloride solution are run into the mixture, causing the dye to be precipitated. It is filtered off and dried. The green dye has the formula

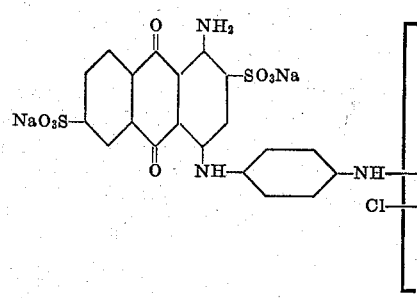

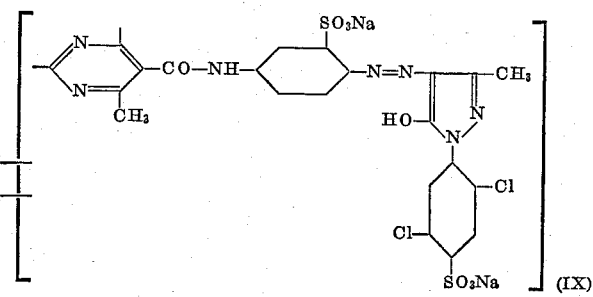

and dyes cotton in yellowish green shades of good light and excellent wet fastness.

*Padding method.*—3 parts of the dye of Example 3 are dissolved in 100 parts of warm water, and 30 parts of 10% sodium carbonate solution and 0.5 part of sodium-1-nitrobenzene-3-sulfonate are added. This solution is padded on a fabric of viscose staple fiber, which is then expressed to an increase of 75% over its dry weight, dried, steamed in wet steam for 5 to 10 minutes at 102°, rinsed with warm and cold water, soaped at the boil if necessary with subsequent warm and cold rinsing, and finally dried. A yellowish green dyeing is obtained having very good washing and light fastness.

Example 4

37 parts of the condensation product of sodium-3-aminobenzene sulfonate and 2,4-dichloropyrimidine-5-carbonyl chloride are dissolved in 600 parts of water at about 20°. In the course of 2 hours 53 parts of sodium-1-amino-4-(4'-amino)-phenylaminoanthraquinone - 2,6 - disulfonate are added with simultaneous dropwise addition of dilute sodium carbonate solution to maintain the pH of the mixture at about 8. On completion of condensation 50 parts of sodium chloride are added, the precipitated dye filtered off, washed with dilute sodium chloride solution and dried. The dye is a dark blue powder which dissolves in water with a greenish blue coloration; it has the formula

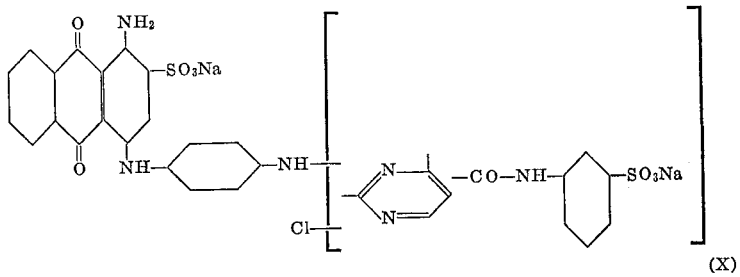

(X)

When the 37 parts of the condensation product of sodium-3-amino-benzene-sulfonate and 2,4-dichloropyrimidine-5-carbonyl chloride in the above example are replaced by 71 parts of the condensation product of sodium-1-amino-4-(4'-amino)-phenyl-aminoanthraquinone - 2,6 - disulfonate and 2,4-dichloropyrimidine-5-carbonyl chloride and the procedure of this example followed, a similar dye is obtained which, however, is of substantive character.

Example 5

74.1 parts of the yellow dye of the formula

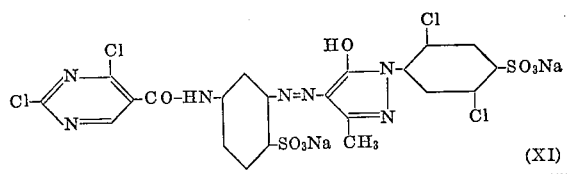

(XI)

are dissolved in 3000 parts of water at 25° and the pH value adjusted to 8. A neutral solution of 19.5 parts of sodium-1-amino-benzene-3-sulfonate in 200 parts of water is added and the pH value kept at 7.5–8.5 by dropping in 20% sodium carbonate solution. When the chromatogram of a sample of the reaction mixture shows that no further starting material is present, the dye is precipitated by the addition of potassium chloride. It is filtered with suction, vacuum dried at 60° and ground to give a yellow powder which dyes cotton by the method of Example 1 in yellow shades.

Example 6

A solution of 74.1 parts of the yellow dye (XI) in 3000 parts of water is prepared as described in Example 5, and at 28–30° a neutral solution of 46.7 parts of sodium-1-hydroxy-2-phenylazo-6-aminonaphthalene - 3,2' - disulfonate in 500 parts of water is added to it. The pH value is maintained at 7.5–8.5 by dropwise addition of 20% sodium carbonate solution until the yellow starting dye is no longer indicated by chromatography. The orange disazo dye of the formula

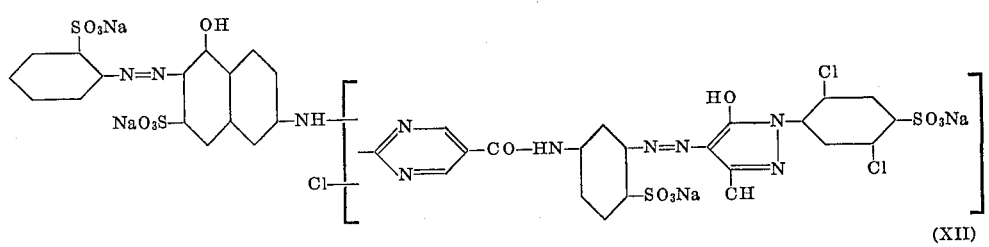

(XII)

is precipitated by the addition of salt, filtered with suction and dried. It is obtained as an orange-brown powder which dissolves in water with an orange coloration. It gives orange dyeings and prints on cellulosic fibers which are fast to wet treatments.

Example 7

41 parts of the dye to the formula

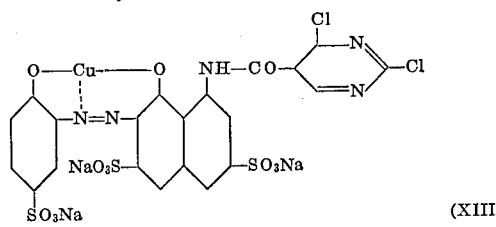

(XIII)

are dissolved in 700 parts of water at 25–30°. The pH value is adjusted to 7.0–7.5 and 20 parts of 10% ammonia solution added. After stirring for several hours at 25–30° condensation is complete. The mixture is neutralized with dilute hydrochloric acid, the dye precipitated with sodium chloride, filtered with suction, washed with sodium chloride solution, dried and ground. The resulting dye powder dissolves in water wtih a violet coloration. It can be printed on cellulosic materials by the method of Example 3 to give violet prints and dyeings fast to light and wet treatments.

Example 8

12.4 parts of the dye of the formula

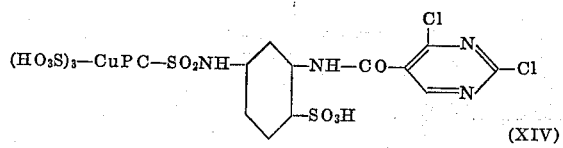
(XIV)

are stirred into 200 parts of water, 1.9 parts of 1-aminobenzene-3-sulfonic acid added, and the pH value of the mixture adjusted to 8.0–8.5 with sodium carbonate solution. It is then heated to 30–35° with slow addition of further sodium carbonate solution to maintain the pH at 8.0–8.5. When the pH remains stable at this value without any further addition, the condensation reaction is completed. The dye is precipitated by the addition of sodium chloride, filtered with suction, washed with sodium chloride solution, vacuum dried at 60° and ground. The dye is obtained as a black powder which dissolves in water to give blue solutions and dyes cotton in brilliant turquoise shades. It has the formula

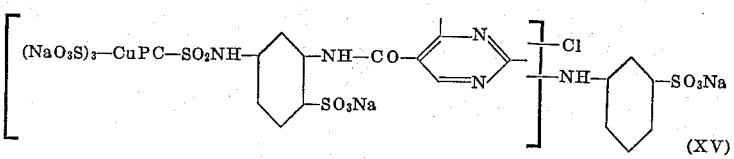
(XV)

Dyes with similar properties are obtained when 4.5 parts of the compound of the formula

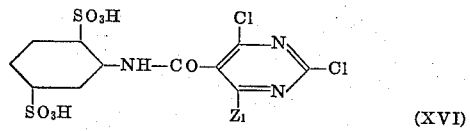
(XVI)

wherein $Z_1$ represents $CH_3$, or 4.8 parts of the compound of Formula XVI wherein $Z_1$ represents a mixture of $CH_3$, $CH_2Cl$ and $CHCl_2$, are condensed with 11.7 parts of the dye of the formula

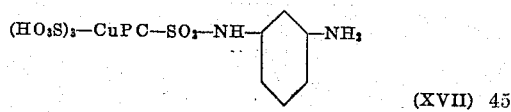
(XVII)

under the same conditions.

Example 9

12.4 parts of the dye of Formula XIV are stirred into 100 parts of water, to which are added 4.6 parts of the yellow dye of the formula

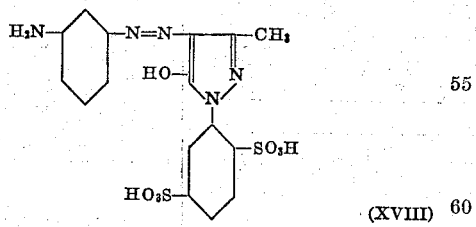
(XVIII)

The condensing reaction is carried out according to the particulars given in Example 8. It yields a dye of the formula

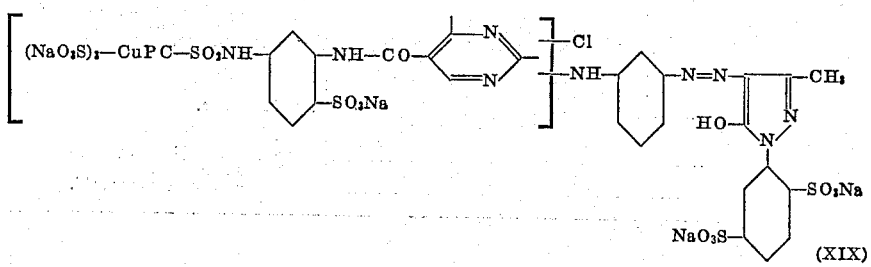
(XIX)

in the form of a green powder, which dissolves in water with a green coloration and dyes cotton in brilliant green shades having very good light and wet fastness.

A dye with similar properties is obtained when 4.5 parts of the compound

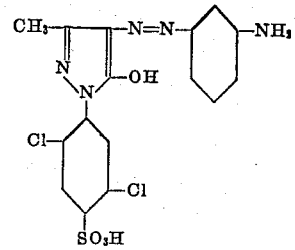
(XX)

are condensed with 11.2 parts of the dye of formula

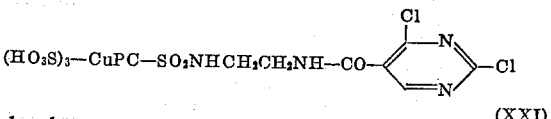
(XXI)

under the same conditions.

The following table gives details of further dyes which can be produced according to the procedures of Examples 1 to 9 and which correspond to the formula

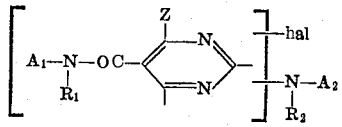

They are defined in the table by the constitutions of the radicals

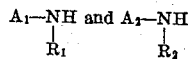

in each of which the amino group is underlined, by the radical

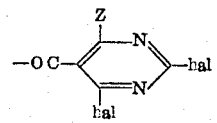

from which the radical

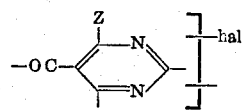

is derived, and by the shade of the dyeing or print on cotton. The table is divided into three parts: in the first part the chemical designations of the radicals

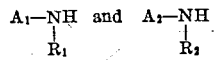

are given, in the second shade of the dyeing or print on cotton, and in the third the starting radicals

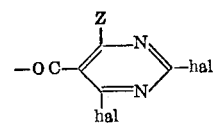

for the final dyes.

TABLE I.—PART 1

| Ex. No. | $A_1$—NH—$R_1$ (I) | $A_2$—NH—$R_2$ (II) |
|---|---|---|
| 10 | 1-amino-4-(4'-aminophenylamino)-anthraquinone-2,5-disulfonic acid. | 1-(2',5-dichlorophenyl)-3-methyl-4-(3''-aminophenylazo)-5-pyrazolone-4'-sulfonic acid. |
| 11 | 1-(2',5'-dichlorophenyl)-3-methyl-4-(3''-aminophenylazo)-5-pyrazolone-4',6''-disulfonic acid. | 1-amino-4-(4'-aminophenyl-amino)-anthraquinone-2,6-disulfonic acid. |
| 12 | 1-amino-4-(3'-aminophenylamino)-anthraquinone-2,4'-disulfonic acid. | 1-amino-4-(3'-aminophenylamino)-anthraquinone-2,4'-disulfonic acid. |
| 13 | 1-aminobenzene-2,5-disulfonic acid. | Do. |
| 14 | 1-amino-4-(3'-amino-4'-methylphenylamino)-anthraquinone,2,6,6'-trisulfonic acid. | 1-(2',5'-dichlorophenyl)-3-methyl-4-(3''-aminophenylazo)-5-pyrazolone-4',6''-disulfonic acid. |
| 15 | 1-amino-4-(3'-aminophenylamino)-anthraquinone-2,4'-disulfonic acid. | 1-(2'-methylphenyl)-3-methyl-4-(3''-aminophenylazo)-5-pyrazolone-4',6''-disulfonic acid. |
| 16 | 1-aminobenzene-3-sulfonic acid. | Do. |
| 17 | 1-phenyl-3-methyl-4-(3''-aminophenylazo)-5-pyrazolone-2',5'-disulfonic acid. | 1-amino-4-(4'-aminophenylamino)-anthraquinone-2,2'-disulfonic acid. |
| 18 | 1-amino-3-methyl-4-(4'-phenylazo)-phenylazo)-benzene-2',4''-disulfonic acid. | Do. |
| 19 | ....do.... | 1-amino-4-(4'-methylaminophenyl-amino)-anthraquinone-2,2'-disulfonic acid. |
| 20 | 1-amino-4-(3'-aminophenylamino)-anthraquinone-2,7,4'-trisulfonic acid. | 1-phenyl-3-methyl-4-(3''-aminophenyl-azo)-5-pyrazolone-2',5'-disulfonic acid. |
| 21 | ....do.... | Do. |
| 22 | 1-amino-4-(4'-aminophenylamino)-anthraquinone-2,7-disulfonic acid. | 1-aminobenzene-4-sulfonic acid. |
| 23 | ....do.... | Do. |
| 24 | 1-amino-4-(4'-aminophenylamino)-anthraquinone-2,7-disulfonic acid. | 1-amino-4-(4'-aminophenylamino)-anthraquinone-2,7-disulfonic acid. |
| 25 | 1-amino-4-(4'-aminophenylamino)-anthraquinone-2,5-disulfonic acid. | 1-(2'-methylphenyl)-3-methyl-4-(3''-aminophenylazo)-5-pyrazolone-4',6''-disulfonic acid. |
| 26 | 1-aminobenzene-2,5-disulfonic acid. | 1-amino-4-[4'-(4''-aminophenyl)-phenylamino]-anthraquinone-2,6,3''-trisulfonic acid. |
| 27 | 2-(4'-amino-2'-methylphenylazo)-naphthalene-4,8-disulfonic acid. | Bis-(2-hydroxyethyl)-amine. |
| 28 | ....do.... | 2-aminoethanesulfonic acid. |
| 29 | 1-hydroxy-2-(4'-methylphenylazo)-8-aminonaphthalene-3,6,2'-trisulfonic acid. | 2-aminobenzene-1-carboxylic acid. |
| 30 | 1-hydroxy-2-phenylazo-8-amino-naphthalene-3,6,2'-trisulfonic acid. | Methylaminoacetic acid. |
| 31 | ....do.... | 2-aminoethanol. |
| 32 | ....do.... | 2-(4'-amino-2'-methylphenylazo)-naphthalene-4,8-disulfonic acid. |
| 33 | ....do.... | 1-amino-4-(4'-aminophenylamino)-anthraquinone-2,6-disulfonic acid. |
| 34 | 1:2-cobalt complex compound of 1-(2'-hydroxy-5'-nitrophenylazo)-2-hydroxy-3-aminonaphthalene-7,3'-disulfonic acid. | Methylamine. |
| 35 | ....do.... | 1-amino-3-methoxypropane. |
| 36 | 1:2-chromium complex compound of 1-hydroxy-2-(2'-hydroxy-5'-chlorophenylazo)-8-aminonaphthalene-3,6-disulfonic acid. | 1-aminopropanol-2. |
| 37 | 1:2-chromium complex compound of 1-hydroxy-2-(2'-hydroxy-5'-nitrophenylazo)-8-aminonaphthalene-3,6-disulfonic acid. | 1:2-cobalt complex compound of 1-hydroxy-2-(2'-hydroxy-5'-nitrophenylazo)-8-aminonaphthalene-3,6-disulfonic acid. |
| 38 | Copper complex compound of 1-hydroxy-2-(2'-hydroxy-phenylazo)-8-aminonaphthalene-3,6,3',5'-tetrasulfonic acid. | 1-amino-n-butane. |
| 39 | 1-hydroxy-2-(4'-ethoxyphenylazo)-6-aminonaphthalene-3,2'-disulfonic acid. | 1-aminoethane. |
| 40 | ....do.... | 1-(4'-aminophenylazo)-benzene-4,3'-disulfonic acid. |
| 41 | ....do.... | 1-aminobenzene-3-sulfonic acid. |

TABLE I.—PART 2

| Example: | Shade of dyeing and print on cotton |
|---|---|
| 10 | green |
| 11 | Do. |
| 12 | reddish blue |
| 13 | greenish blue |
| 14 | green |
| 15 | Do. |
| 16 | yellow |
| 17 | green |
| 18 | olivegreen |
| 19 | Do. |
| 20 | green |
| 21 | Do. |
| 22 | greenish blue |
| 23 | Do. |
| 24 | Do. |
| 25 | green |
| 26 | Do. |
| 27 | yellow |
| 28 | Do. |
| 29 | red |
| 30 | red |
| 31 | red |
| 32 | scarlet |
| 33 | violet |
| 34 | brown |
| 35 | Do. |
| 36 | navy blue |
| 37 | black |
| 38 | violet |
| 39 | red |
| 40 | orange |
| 41 | red |

The radical

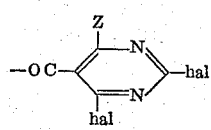

from which the radical

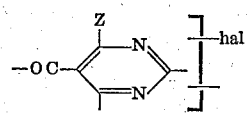

is derived, is

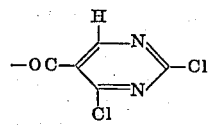

in Examples 10 to 18, 21, 26, 28, 32, 33, and 35 to 39,

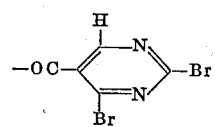

in Examples 19 and 31,

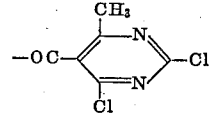

in Examples 22, 24 and 25,

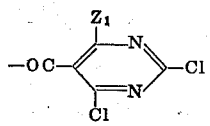

in Examples 20, 23, 29, 30, 40 and 41 (where $Z_1$ is a mixture of $CH_3$, $CH_2Cl$ and $CHCl_2$),

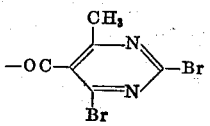

in Example 27 and

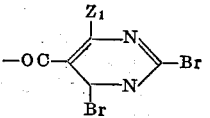

in Example 34 (where $Z_1$ is a mixture of $CH_3$, $CH_2Br$ and $CHBr_2$).

Formulae of representative dyes of the foregoing examples are as follows:

*Example 5*

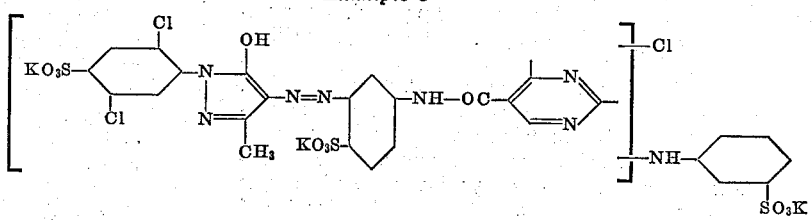

*Example 7*

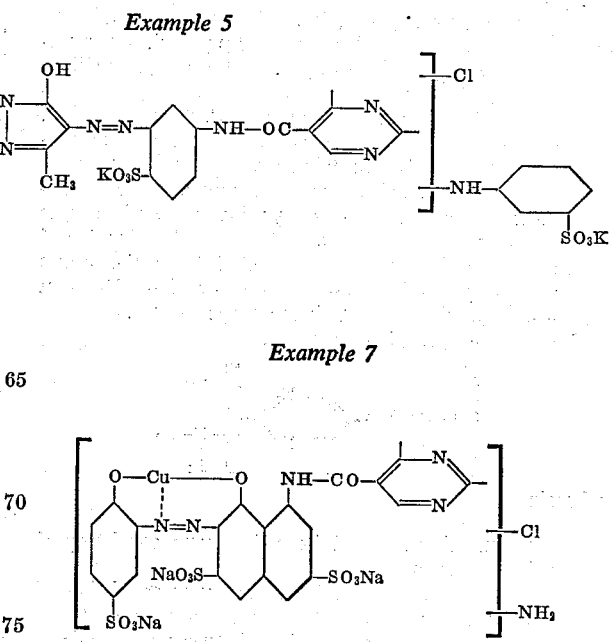

Example 12

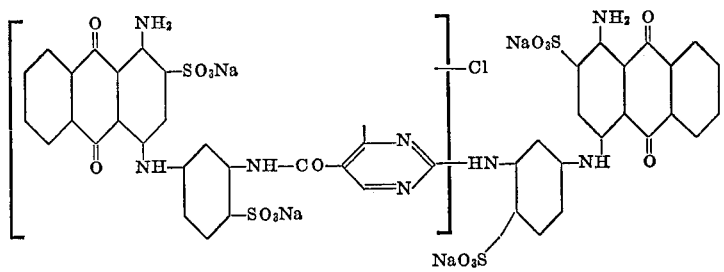

Having thus disclosed the invention what I claim is:
1. Reactive dyes of the formula

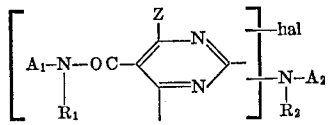

wherein
hal is a member selected from the group consisting of chlorine and bromine,
$R_1$ is a member selected from the group consisting of hydrogen, lower alkyl, lower hydroxyalkyl, (lower) alkoxy (lower) alkyl and lower phenylalkyl,
$R_2$ is a member selected from the group consisting of hydrogen, lower alkyl, lower hydroxyalkyl, (lower) alkoxy (lower) alkyl and lower phenylalkyl,
Z is a member selected from the group consitsing of hydrogen, chlorine, bromine, $CH_3$, $CH_2Cl$, $CHCl_2$, $CH_2Br$ and $CHBr_2$,
$A_1$ is a member selected from the group consisting of hydrogen, lower alkyl, lower hydroxyalkyl, (lower) alkoxy (lower) alkyl, lower carboxyalkyl, lower sulfoalkyl, lower dicarboxyalyl, lower phenylalkyl, phenyl carboxyphenyl, dicarboxyphenyl, sulfophenyl, disulfophenyl, sulfonaphthyl, disulfonaphthyl, the radicals of monoazo dyes, disazo dyes, 1:1-copper and 1:1 nickel, complex azo dyes, 1:2-cobalt complex azo dyes, 1:2-chromium complex azo dyes, anthraquinone dyes, phthalocyanine dyes, nitro dyes and formazane dyes, the said dye radicals bearing 1 to 4 water-solubilizing groups selected from the group consisting of —$SO_3H$, —$SO_2$—$NH_2$ and —COOH, and
$A_2$ is a member selected from the group consisting of hydrogen, lower alkyl, lower hydroxyalkyl, (lower) alkoxy (lower) alkyl, lower carboxyalkyl, lower sulfoalkyl, lower dicarboxyalkyl, lower phenylalkyl, phenyl, carboxyphenyl, dicarboxyphenyl, sulfophenyl, disulfophenyl, sulfonaphthyl, disulfonaphthyl, the radicals of monoazo dyes, disazo dyes, 1:1-copper and 1:1 nickel, complex azo dyes, 1:2-cobalt complex azo dyes, 1:2-chromium complex azo dyes, anthraquinone dyes, phthalocyanine dyes, nitro dyes and formazane dyes, the said radicals bearing 1 to 4 water-solubilizing groups selected from the group consisting of —$SO_3H$, —$SO_2$—$NH_2$ and —COOH, at least one of $A_1$ and $A_2$ being a dye radical.

2. Reactive dyes of the formula

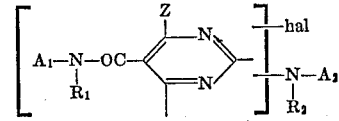

wherein
hal is a member selected from the group consisting of chlorine and bromine,
$R_1$ is a member selected from the group consisting of hydrogen, lower alkyl, lower hydroxyalkyl, (lower) alkoxy (lower) alkyl and lower phenylalkyl,
$R_2$ is a member selected from the group consisting of hydrogen, lower alkyl, lower hydroxyalkyl, (lower) alkoxy (lower) alkyl and lower phenylalkyl,
Z is a member selected from the group consisting of hydrogen, chlorine, bromine, $CH_3$, $CH_2Cl$, $CH_2Br$ and $CHBr_2$,
$A_1$ is a member selected from the group consisting of hydrogen, lower alkyl, lower hydroxyalkyl, (lower) alkoxy (lower) alkyl, lower carboxyalkyl, lower dicarboxyalkyl, lower sulfoalkyl, lower phenylalkyl, phenyl, carboxyphenyl, dicarboxyphenyl, sulfophenyl, disulfophenyl, sulfonaphthyl, disulfonaphthyl, the radicals of benzene-azo-benzene dyes, of benzene-azo-naphthalene dyes, of benzene-azo-5-pyrazolone dyes, of benzene-azo-barbituric acid dyes, of benzene-azo-acetoacetylamino dyes, of naphthalene-azo-naphthalene dyes, of naphthalene-azo-5-pyrazolone dyes, of naphthalene-azo-acetoacetylamino dyes, of diphenyl-azo-naphthalene dyes, of diphenyl-azo-5-pyrazolone dyes and of pyrene-azo-benzene dyes, the said monoazo dyes bearing 1 to 4 —$SO_3H$ groups, the radicals of the 1:1-copper, 1:1-nickel, 1:2-chromium and 1:2-cobalt complex compounds of the aforesaid monoazo dyes, the radicals of benzene-azo-benzene-azo-benzene-dyes, of benzene-azo-benzene-azo-naphthalene dyes, of benzene-azo-benzene-azo-5-pyrazolone dyes, of benzene-azo-naphthalene-azo-benzene dyes, of naphthalene-azo-diphenyl-azo-benzene dyes, of naphthalene-azo-diphenyl-azo-naphthalene dyes and of naphthalene-azo-naphthalene-azo-naphthalene dyes, the said disazo dyes bearing 2 to 4 —$SO_3H$ groups, the radicals of the 1:1-copper, 1:1-nickel, 1:2-chromium and 1:2-cobalt complex compounds of the aforesaid disazo dyes, the radicals of 1-amino-2-sulfo-4-arylaminoanthraquinone dyes having a total of from 2 to 3 —$SO_3H$ groups and wherein the aryl is hydrocarbon and from mononuclear to binuclear, the radicals of copperphthalocyanine and nickel-phthalocyanine dyes containing from 2 to 4 water-solubilizing substituents selected from the group consisting of —$SO_3H$ and —$SO_2$—$NH_2$, the radicals of 2-nitro-1,1'-diphenylamino dyes bearing 1 to 2 —$SO_3H$ groups and the radicals of metal-containing formazane dyes with 1 to 3 —$SO_3H$ groups, and
$A_2$ is a member selected from the group consisting of hydrogen, lower alkyl, lower hydroxyalkyl, (lower) alkoxy (lower) alkyl, lower carboxyalkyl, lower dicarboxyalkyl, lower sulfoalkyl, lower phenylalkyl, pheny, carboxyphenyl, dicarboxyphenyl, sulfophenyl, disulfophenyl, sulfonaphthyl, disulfonaphthyl, the radicals of benzene-azo-benzene dyes, of benzene-azo-naphthalene dyes, of benzene-azo-5-pyrazolone dyes, of benzene-azo-barbituric acid dyes, of benzene-azo-acetoacetylamino dyes, of naphthalene-azo-naphthalene dyes, of naphthalene-azo-5-pyrazolone dyes, of naphthalene-azo-acetoacetylamino dyes, of diphenyl-azo-naphthalene dyes, of diphenyl-azo-5-pyrazolone dyes and of pyrene-azo-benzene dyes, the said monoazo dyes bearing 1 to 4 —$SO_3H$ groups, the radicals of the 1:1-copper, 1:1-nickel, 1:2-chromium and 1:2-cobalt complex compounds of the aforesaid monoazo dyes, the radicals of benzene-azo-benzene-azo - benzene - dyes, of benzene - azo - benzene - azo-naphthalene dyes, of benzene-azo-benzene-azo-5-pyrazolone dyes, of benzene-azo-naphthalene-azo-benzene dyes, of naphthalene-azo-diphenyl-azo-benzene dyes, of naphthalene-azo-diphenyl-azo-naphthalene dyes and of naphthalene - azo - naphthalene - azo-naphthalene dyes, the said disazo-dyes bearing 2 to 4 —SO₃H groups, the radicals of the 1:1-copper, 1:1-nickel, 1:2-chromium and 1:2-cobalt complex compounds of the aforesaid disazo dyes, the radicals of 1-amino-2-sulfo-4-arylaminoanthraquinone dyes having a total of from 2 to 3 —SO₃H groups and wherein the aryl is hydrocarbon and from mononuclear to binuclear, the radicals of copper-phthalocyanine and nickel-phthalocyanine dyes containing from 2 to 4 water-solubilizing substituents selected from the group consisting of —SO₃H and —SO₂—NH₂, the radicals of 2-nitro-1,1'-diphenylamine dyes bearing 1 to 2 —SO₃H groups and the radicals of metal-containing formazane dyes with 1 to 3 —SO₃H groups, at least one of A₁ and A₂ being a dye radical.

3. The reactive dye of the formula

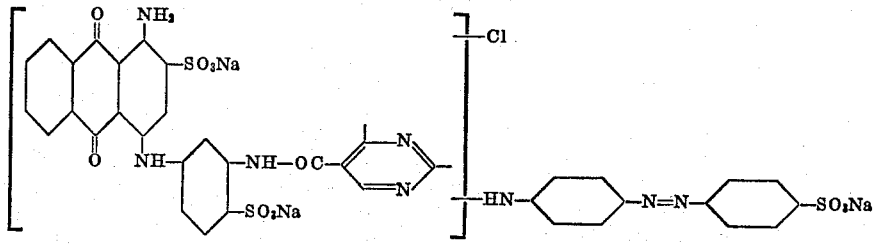

4. The reactive dye of the formula

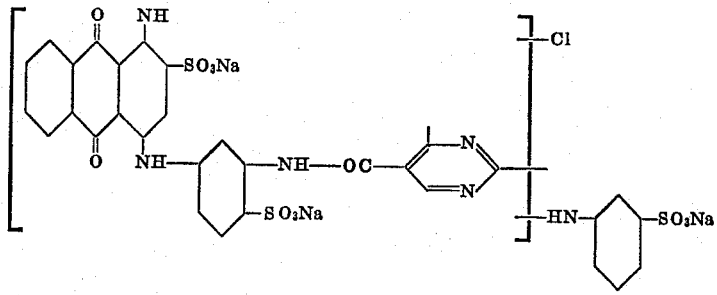

5. The reactive dye of the formula

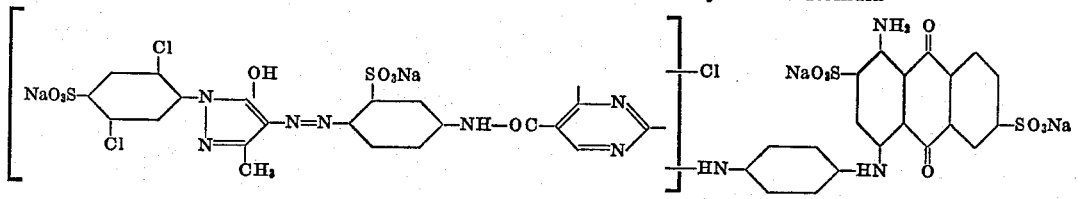

6. The reactive dye of the formula

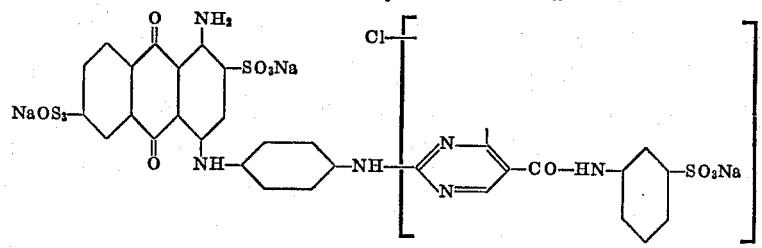

7. The reactive dye of the formula

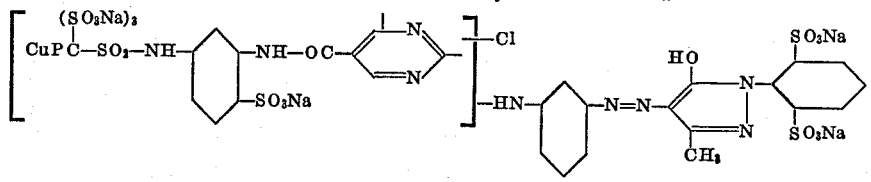

8. The reactive dye of the formula

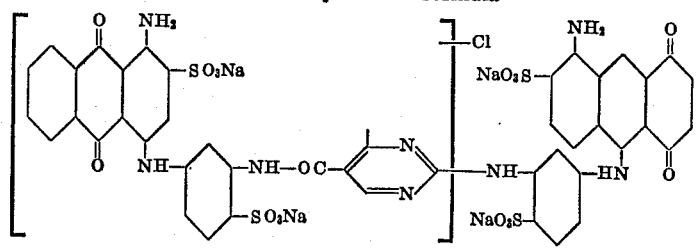

(References on following page)

References Cited

UNITED STATES PATENTS
1,667,312 4/1928 Fritzsche et al. _____ 260—153

FOREIGN PATENTS
221,678 6/1962 Austria.
1,247,660 10/1960 France.

CHARLES B. PARKER, *Primary Examiner.*

F. HIGEL, *Assistant Examiner.*

UNITED STATES PATENT OFFICE
CERTIFICATE OF CORRECTION

Patent No. 3,342,797            September 19, 1967

Jacques Guenthard

It is hereby certified that error appears in the above numbered patent requiring correction and that the said Letters Patent should read as corrected below.

Column 1, line 55, for "formula" read -- formulae --; line 58, for "and", first occurrence, read -- or --; line 5, for "i.g." read -- e.g. --; line 69, after "amino" insert -- group --; column 2, line 24, before "ms" insert a hyphen; line 28, for "chrominum" read -- chromium --; column 3, line , for "is is" read -- it is --; lines 9 and 10, should appear s shown below instead of as in the patent:

lines 34 to 35, after the formula insert a period; column 4, line 45, for "-napthalene" read -- -naphthalene --; column 5, line 1, for "consist" read -- consists --; column 6, line 6, for "amino-4″methoxyphenylsulfonyl)formazane" read -- amino-4″-methoxyphenylsulfonyl)formazane --; line 22, for "monozao" read -- monoazo --; column 8, lines 51 and 52, for "polygyco" read -- polyglycol --; column 9, line 36, for "2,4-disulfonic" read -- 2,4′-disulfonic --; same column 9, formula (VII), for that portion of the formula reading:

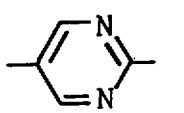     read     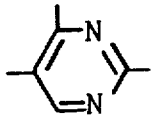

column 11, formula (X) should appear as shown below instead of as in the patent:

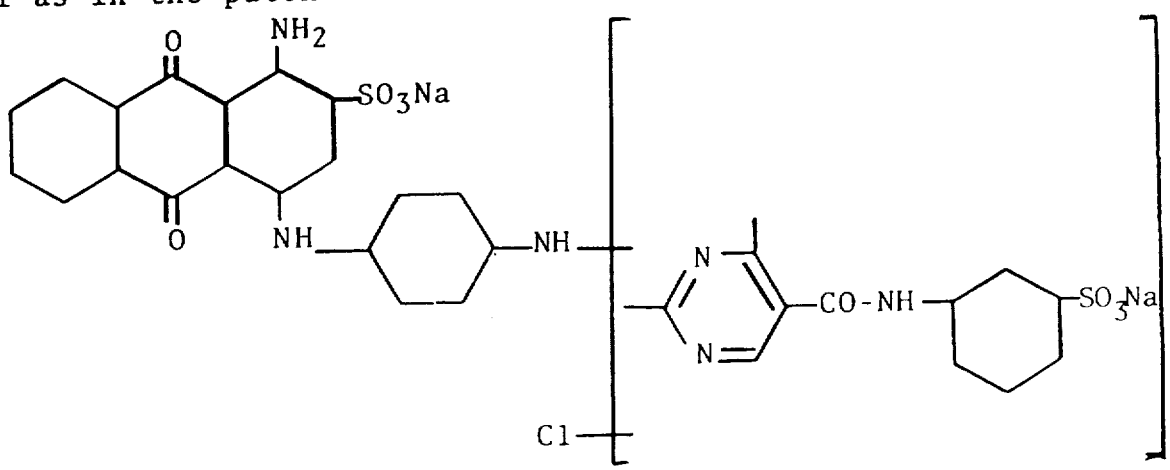

column 12, formula (XIII), the upper right-hand portion of the formula should appear as shown below instead of as in the patent:

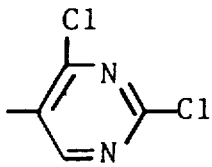

ame column 12, line 72, for "wtih" read -- with --; column 16, ine 1, after "second" insert -- the --; columns 15 and 16, ABLE I, Ex. No. 10, first column, line 1, for "4′-amino" read -- 4′-amino --; line 2, for "2,⁵/₈" read -- 2,5/8 --; second olumn, line 2, for "3″-amino" read -- 3″-amino --; Ex. No. 11, first column, line 2, for "3″-amino" read -- 3″-amino --; second column, line 1, for "4′-amino" read -- 4′-amino --; Ex. No. 12, first column, line 1, and second column, line 1, for "3′-amino", each occurrence, read -- 3′-amino --; Ex. No. 13, first column, line 1, for "1-amino" read -- 1-amino --; Ex. No. 14, first column, line 1, for "3′-amino" read -- 3′-amino --; second column, line 2, for "3″-amino" read -- 3″-amino --; Ex. No. 15, second column, lines 1 and 2, for "3″-amino" read -- 3″-amino --; Ex. No. 17, first column, line 1, for "3″-amino" read -- 3″-amino --; second column, line 1, for "4′-amino" read -- 4′-amino --; Ex. No. 18, first column, line 1, for "1-amino" read -- 1-amino --; Ex. No. 19, second column, line 1, for "methylamino" read -- methylamino --; Ex. No. 20, first column, line 1, for "3′-amino" read -- 3′-amino --; second column, line 1, for "3″-amino" read -- 3″-amino --; Ex. No. 22, first column, line 1, for "4′-amino" read -- 4′-amino --; second column, line 1, for "1-aminobenzene" read -- 1-aminobenzene --; Ex. No. 23, second column, line 1, for "Do" read -- 1-aminobenzene-4-sulfonic acid --; Ex. No. 24, first column, line 1, and second column, line 1, for "4′-amino", each occurrence, read -- 4′-amino --; Ex. No. 25, first column, line 1, for "4′-amino" read -- 4′-amino --; same column 1, line 2, for "2,⁵/₈" read -- 2,5/8 --; second column, line 2, for "aminophenylazo" read -- aminophenylazo --; Ex. No. , first column, line 1, for "aminobenzene" read -- aminobenzene --; Ex. No. 27, first column, line 1, for "amino" read -- amino --; second column, line 1, for "amine" read -- amine --; Ex No. 28, second column, line 1, for "amino" read -- amino --; Ex. No. 29, first column, line 2, and second column, line 1, for "amino", each occurrence, read -- amino --; Ex. No. 30, first column, line 1, for "amino" read -- amino --; second column, line 1, for "Methylaminoacetic" read -- Methylaminoacetic --; Ex. No. 31, second column, line 1, for "-aminoethanol" read -- -aminoethanol --; Ex. No. 32, second column, line 1, for "amino" read -- amino --; Ex. No. 33, second column, line 1, for "aminophenylamino" read -- aminophenylamino --; Ex. No. 34, first column, line 3, for "aminonaphthalene" read -- aminonaphthalene --; second column, line 1, for "Methylamine" read -- Methylamine --; Ex. No. 35, second column, line 1, for "amino" read -- amino --; Ex. No. 36, first column, line 3, and second column, line 1, for "amino", each occurrence, read -- amino --; Ex. No. 37, first column, line 3, and second column, line 3, for "aminonaphthalene", each occurrence, read -- aminonaphthalene --; Ex. No. 38, first column, line 3, and second column, line 1, for "amino", each occurrence, read -- amino --; Ex. No. 39, first column, line 2, and second column, line 1, for "amino", each occurrence, read -- amino --; Ex. No. 40, second column, line 1, for "aminophenylazo" read -- aminophenylazo --; Ex. No. 41, second column, line 1, for "aminobenzene" read -- aminobenzene --;

column 19, line 38, for "dicarboxyalyl" read -- dicarboxyalkyl --; column 20, line 64, for "pheny" read -- phenyl --; columns 21 and 22, claim 6, the right-hand portion of the formula should appear as shown below instead of as in the patent:

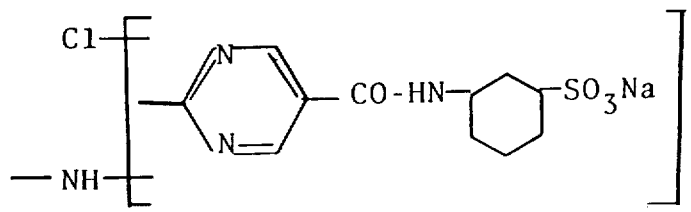

ame columns 21 and 22, claim 8, the right-hand portion of the ormula should appear as shown below instead of as in the patent:

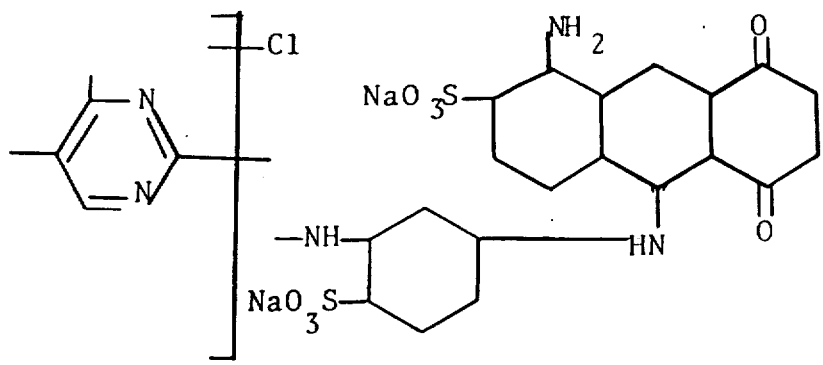

Signed and sealed this 14th day of January 1969.

(SEAL)
Attest:

EDWARD M. FLETCHER, JR.
Attesting Officer

EDWARD J. BRENNER
Commissioner of Patents

UNITED STATES PATENT OFFICE
CERTIFICATE OF CORRECTION

Patent No. 3,342,797                  September 19, 1967

Jacques Guenthard

It is hereby certified that error appears in the above numbered patent requiring correction and that the said Letters Patent should read as corrected below.

Column 1, line 55, for "formula" read -- formulae --; line 58, for "and", first occurrence, read -- or --; line 65, for "i.g." read -- e.g. --; line 69, after "amino" insert -- group --; column 2, line 24, before "ms" insert a hyphen; line 28, for "chrominum" read -- chromium --; column 3, line 4, for "is is" read -- it is --; lines 9 and 10, should appear as shown below instead of as in the patent:

-SO$_2$-NH-CH$_2$-CH2-          or lines 34 to 35, after the formula insert a period; column 4, line 45, for "-napthalene" read -- -naphthalene --; column 5, line 1, for "consist" read -- consists --; column 6, line 6, for "amino-4″methoxyphenylsulfonyl)formazane" read -- amino-4″-methoxyphenylsulfonyl)formazane --; line 22, for "monozao" read -- monoazo --; column 8, lines 51 and 52, for "polygyco" read -- polyglycol --; column 9, line 36, for "2,4-disulfonic" read -- 2,4′-disulfonic --; same column 9, formula (VII), for that portion of the formula reading:

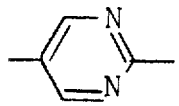          read          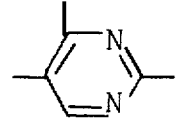

column 11, formula (X) should appear as shown below instead of as in the patent:

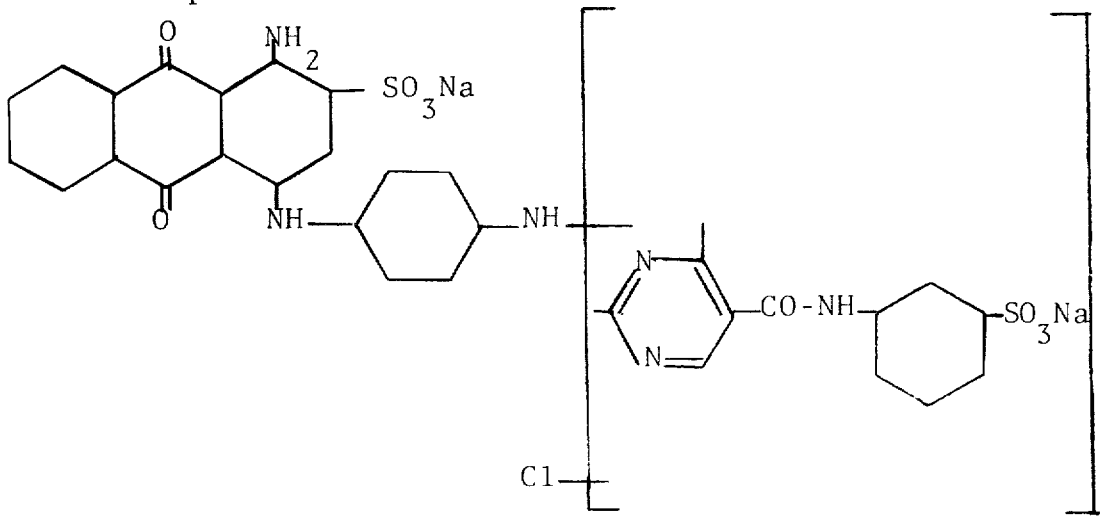

column 12, formula (XIII), the upper right-hand portion of the formula should appear as shown below instead of as in the patent:

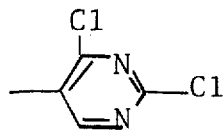

same column 12, line 72, for "wtih" read -- with --; column 16, line 1, after "second" insert -- the --; columns 15 and 16, TABLE I, Ex. No. 10, first column, line 1, for "4′-amino" read -- 4′-amino --; line 2, for "2,⁵/₈" read -- 2,5/8 --; second column, line 2, for "3″-amino" read -- 3″-amino --; Ex. No. 11, first column, line 2, for "3″-amino" read -- 3″-amino --; second column, line 1, for "4′-amino" read -- 4′-amino --; Ex. No. 12, first column, line 1, and second column, line 1, for "3′-amino", each occurrence, read -- 3′-amino --; Ex. No. 13, first column, line 1, for "1-amino" read -- 1-amino --; Ex. No. 14, first column, line 1, for "3′-amino" read -- 3′-amino --; second column, line 2, for "3″-amino" read -- 3″-amino --; Ex. No. 15, second column, lines 1 and 2, for "3″-amino" read -- 3″-amino --; Ex. No. 17, first column, line 1, for "3″-amino" read -- 3″-amino --; second column, line 1, for "4′-amino" read -- 4′-amino --; Ex. No. 18, first column, line 1, for "1-amino" read -- 1-amino --; Ex. No. 19, second column, line 1, for "methylamino" read -- methylamino --; Ex. No. 20, first column, line 1, for "3′-amino" read -- 3′-amino --; second column, line 1, for "3″-amino" read -- 3″-amino --; Ex. No. 22, first column, line 1, for "4′-amino" read -- 4′-amino --; second column, line 1, for "1-aminobenzene" read -- 1-aminobenzene --; Ex. No. 23, second column, line 1, for "Do" read -- 1-aminobenzene-4-sulfonic acid --; Ex. No. 24, first column, line 1, and second column, line 1, for "4′-amino", each occurrence, read -- 4′-amino --; Ex. No. 25, first column, line 1, for "4′-amino" read -- 4′-amino --; same column 1, line 2, for "2,⁵/₈" read -- 2,5/8 --; second column, line 2, for "aminophenylazo" read -- aminophenylazo --; Ex. No. 26, first column, line 1, for "aminobenzene" read -- aminobenzene --; Ex. No. 27, first column, line 1, for "amino" read -- amino --; second column, line 1, for "amine" read -- amine --; Ex. No. 28, second column, line 1, for "amino" read -- amino --; Ex. No. 29, first column, line 2, and second column, line 1, for "amino", each occurrence, read -- amino --; Ex. No. 30, first column, line 1, for "amino" read -- amino --; second column, line 1, for "Methylaminoacetic" read -- Methylaminoacetic --; Ex. No. 31, second column, line 1, for "-aminoethanol" read -- -aminoethanol --; Ex. No. 32, second column, line 1, for "amino" read -- amino --; Ex. No. 33, second column, line 1, for "aminophenylamino" read -- aminophenylamino --; Ex. No. 34, first column, line 3, for "aminonaphthalene" read -- aminonaphthalene --; second column, line 1, for "Methylamine" read -- Methylamine --; Ex. No. 35, second column, line 1, for "amino" read -- amino --; Ex. No. 36, first column, line 3, and second column, line 1, for "amino", each occurrence, read -- amino --; Ex. No. 37, first column, line 3, and second column, lin 3, for "aminonaphthalene", each occurrence, read -- aminonaphthalene --; Ex. No. 38, first column, line 3, and second column, line 1, for "amino", each occurrence, read -- amino --; Ex. No. 39, first column, line 2, and second column, line 1, for "amino", each occurrence, read -- amino --; Ex. No. 40, second column, line 1, for "aminophenylazo" read -- aminophenylazo --; Ex. No. 41, second column, line 1, for "aminobenzene" read -- aminobenzene --; column 19, line 38, for "dicarboxyalyl" read -- dicarboxyalkyl --; column 20, line 64, for "pheny" read -- phenyl --; columns 21 and 22, claim 6, the right-hand portion of the formula should appear as shown below instead of as in the patent:

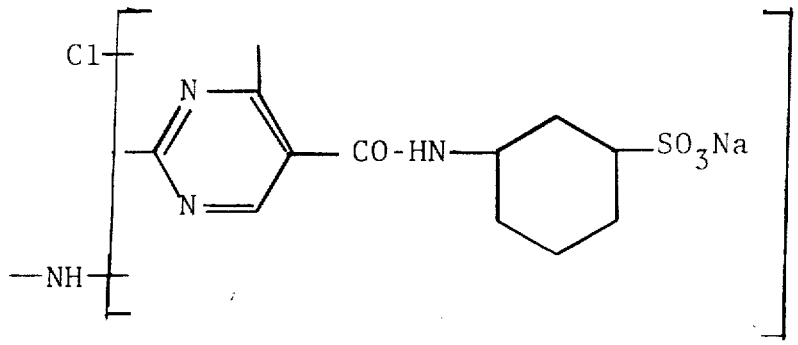

same columns 21 and 22, claim 8, the right-hand portion of the formula should appear as shown below instead of as in the patent:

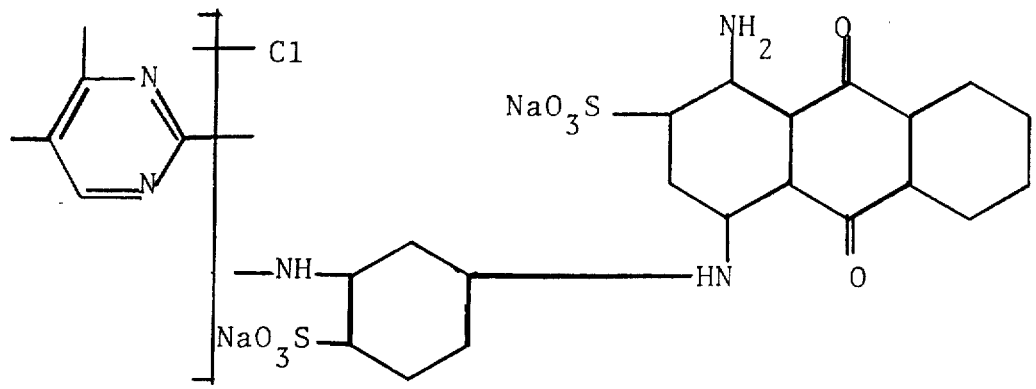

This certificate supersedes Certificate of Correction issued January 14, 1969.

Signed and sealed this 18th day of November 1969.

(SEAL)
Attest:

EDWARD M. FLETCHER, JR.
Attesting Officer

WILLIAM E. SCHUYLER, JR.
Commissioner of Patents